R. LYNEX.
Animal-Trap.
No. 210,342.    Patented Nov. 26, 1878.
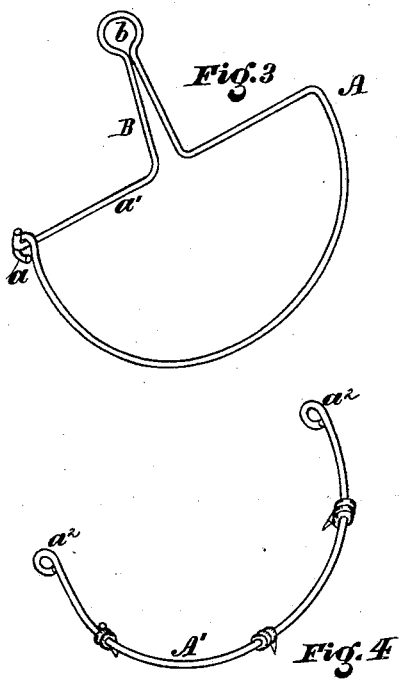
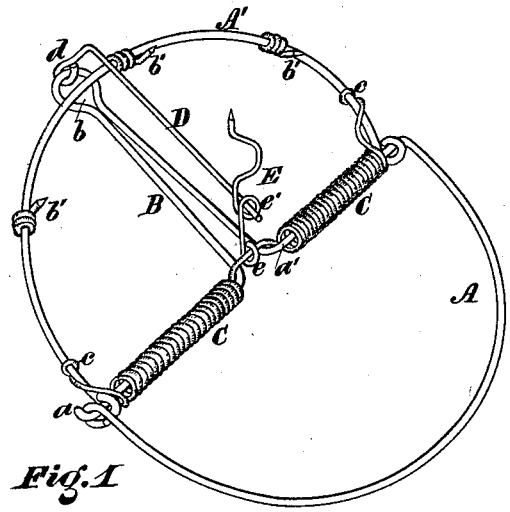
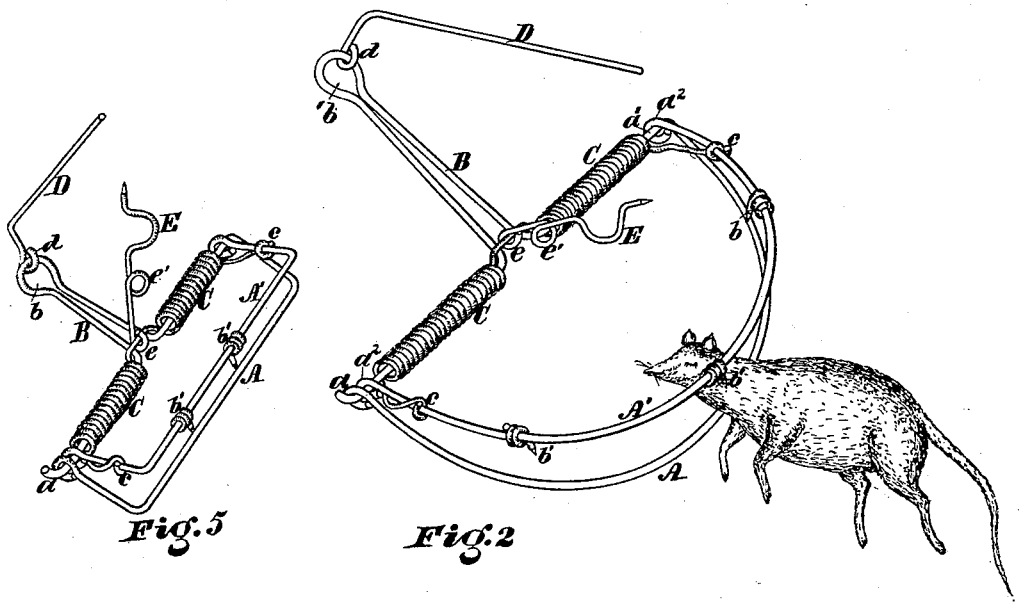
Fig. 1   Fig. 3   Fig. 4   Fig. 5   Fig. 2
WITNESSES:
Saml. J. VanStavoren
D. P. Cowl
INVENTOR
Richard Lynex
by Connell Bros.
ATTORNEYS.

UNITED STATES PATENT OFFICE.

RICHARD LYNEX, OF PHILADELPHIA, PENNSYLVANIA.

IMPROVEMENT IN ANIMAL-TRAPS.

Specification forming part of Letters Patent No. 210,342, dated November 26, 1878; application filed October 14, 1878.

*To all whom it may concern:*

Be it known that I, RICHARD LYNEX, of Philadelphia, in the county of Philadelphia and State of Pennsylvania, have invented certain new and useful Improvements in Traps for Game, &c.; and I do hereby declare the following to be a full, clear, and exact description of the invention, such as will enable others skilled in the art to which it pertains to make and use it, reference being had to the accompanying drawings, which form part of this specification, in which—

Figure 1 is a perspective, showing the trap set. Fig. 2 is a perspective, showing the trap sprung. Figs. 3 and 4 are detail perspectives of the jaws of the trap. Fig. 5 is a perspective of a modification.

This invention has relation to traps for game; and consists in the novel construction and combination of devices in a trap, which comprises a pair of pivoted jaws, a closing spring, a trigger, and hook, all as hereinafter described, and set forth in claims.

In the drawing, A is a piece of wire, which is bent so as to form one of the jaws and the handle of the trap. This is accomplished by bending the wire at one end into a semicircle. The other end is bent around to form the chord of said semicircle, the two ends being looped or hooked together at $a$. A loop, B, having a ring, $b$, at its end, is formed in the center of the chord $a^1$, said loop serving to form a handle, by which the trap may be suspended or carried around when set.

A' is a second piece of wire, bent into a semicircle and pivoted to the jaw A by bending its ends around the chord $a^1$ to form eyes $a^2 a^2$, and composes the other jaw of the trap. The jaw A' is provided with teeth $b' b' b'$, which are formed by wrapping short wires around said jaw and allowing one of their ends to project, as shown.

C is a spiral spring surrounding the part $a^1$ of the jaw A. Said spring is fastened at $c c$ to the jaw A'. The object of this spring is to draw the jaws A A¹ together when the trap is sprung.

The spring C, as may be seen, is wound in two sections, encircling, respectively, the branches of part $a$ on either side of the handle. The coil of the two sections are reversed with respect to each other—that is, the coils of one section are wound in the opposite direction to those of the other. The result is, that at the extreme ends of the spring the force is exerted in one direction, and hence the full power of the spring utilized.

D is the trigger, pivoted to the loop B at $d$, and E is the bait-hook, pivoted at $e$, and having an eye, $e'$, for the reception of the end of the trigger D.

The operation of the trap is as follows: The jaws A A' are spread apart until they form a circle. The trigger D is then passed over the jaw A' and into the eye $e'$ of the bait-hook E, thus keeping the jaws A A' apart until the bait-hook is slipped off the end of the trigger, when the jaws are brought together suddenly by the spring C, the prey being pierced and held by the teeth $b b b$.

When set the trap may be either laid on the ground or suspended by a cord attached to the loop B.

In the foregoing description the jaws A A' are spoken of as being made semicircular in shape, and Figs. 1, 2, 3, and 4 of the drawing show them accordingly; but my invention is not limited thereto, as said jaws may be made retangular or oblong, as shown in Fig. 5, or in oval or any approximate form. So, too, I have shown only one bait-hook and trigger; but two or more may be employed, if desired, being constructed and arranged to operate substantially as the single hook and trigger do, save that they will be on either side of the center or central hook.

What I claim is—

1. The trap herein described, consisting of the jaws A A', each composed of a piece of wire bent to the required form and hooked or hinged together, the wire of jaw A' being continued and bent to form a handle, B, for the trap, said jaws and handle being combined with the spiral spring C, connected to both jaws, the bait-hook E, and trigger D, substantially as shown and described.

2. The combination of the bent-wire jaws A A', coiled spring C, bait-hook E, and trigger D, substantially as shown and described.

3. The spring C, made in two sections, one section having its coils reversed with respect to those of the other and integral therewith, as described and shown.

4. The combination, with the jaws A A' and chord $a^1$, of the spring C, made in two sections, one having coils reversed with respect to those of the other, said spring being locked within the outline or between the ends of the jaws and its extremities attached to the jaw A, as and for the purpose described.

In testimony that I claim the foregoing I have hereunto set my hand this 8th day of October, 1878.

RICHARD LYNEX.

Witnesses:
  JOS. B. CONNOLLY,
  CHAS. F. VAN HORN.